United States Patent
Oba et al.

(10) Patent No.: US 9,298,258 B2
(45) Date of Patent: Mar. 29, 2016

(54) DISPLAY APPARATUS AND CONTROL METHOD

(71) Applicant: SONY CORPORATION, Tokyo (JP)

(72) Inventors: Haruo Oba, Kanagawa (JP); Yusuke Sakai, Kanagawa (JP); Eijiro Mori, Tokyo (JP); Kenichi Okada, Tokyo (JP); Katsunori Tanaka, Tokyo (JP); Shinichi Hayashi, Gifu (JP); Tomohiko Gotoh, Kanagawa (JP); Shingo Tsurumi, Saitama (JP); Asako Tadenuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/532,770

(22) Filed: Nov. 4, 2014

(65) Prior Publication Data

US 2015/0054738 A1    Feb. 26, 2015

Related U.S. Application Data

(63) Continuation of application No. 13/393,844, filed as application No. PCT/JP2010/062310 on Jul. 22, 2010, now Pat. No. 8,913,007.

(30) Foreign Application Priority Data

Sep. 11, 2009    (JP) .................................. 2009-210988

(51) Int. Cl.
*G06F 3/01*    (2006.01)
*H04N 21/4223*    (2011.01)
(Continued)

(52) U.S. Cl.
CPC ................ *G06F 3/013* (2013.01); *G06F 3/005* (2013.01); *H04N 21/4223* (2013.01);
(Continued)

(58) Field of Classification Search
CPC ........... G06F 3/005; G06F 3/01; G06F 3/013; G09G 5/00; H04N 21/00; H04N 21/4223; H04N 21/4415; H04N 21/4882
See application file for complete search history.

(56) References Cited

U.S. PATENT DOCUMENTS

| 6,076,928 | A  | 6/2000 | Fateh et al. |
| 8,248,512 | B2 | 8/2012 | Kondo et al. |

(Continued)

FOREIGN PATENT DOCUMENTS

| CN | 101409784 A | 4/2009 |
| EP | 0656730 A1  | 6/1995 |

(Continued)

OTHER PUBLICATIONS

International Search Report Issued Oct. 12, 2010 in PCT/JP10/62310 Filed Jul. 22, 2010.

(Continued)

*Primary Examiner* — Joe H Cheng
(74) *Attorney, Agent, or Firm* — Oblon, McClelland, Maier & Neustadt, L.L.P.

(57) ABSTRACT

A display apparatus and a control method capable of preventing its user from viewing an image in an improper viewing position are provided. The display apparatus includes: an imaging unit that captures a moving image in a predetermined range with respect to an image display direction; an image analyzer that analyzes the moving image captured by the imaging unit, and calculates a position of a target that should be guided to a proper viewing position; and a display controller that causes a display unit to perform display to guide the target to the proper viewing position when the target position calculated by the image analyzer is at an improper viewing position.

8 Claims, 12 Drawing Sheets

(51) Int. Cl.
*H04N 21/44* (2011.01)
*H04N 21/488* (2011.01)
*G06F 3/00* (2006.01)
*H04N 21/4415* (2011.01)

(52) U.S. Cl.
CPC .... *H04N 21/44008* (2013.01); *H04N 21/4882* (2013.01); *G09G 2320/028* (2013.01); *G09G 2320/0261* (2013.01); *G09G 2354/00* (2013.01); *H04N 21/4415* (2013.01)

(56) References Cited

U.S. PATENT DOCUMENTS

| | | | |
|---|---|---|---|
| 8,614,674 | B2 | 12/2013 | Binder |
| 2001/0012001 | A1 | 8/2001 | Rekimoto et al. |
| 2001/0015792 | A1 | 8/2001 | Fateh et al. |
| 2005/0216867 | A1 | 9/2005 | Marvit et al. |
| 2005/0264758 | A1 | 12/2005 | Wakamori |
| 2006/0050267 | A1 | 3/2006 | Murakami et al. |
| 2006/0164682 | A1 | 7/2006 | Lev |
| 2006/0242662 | A1 | 10/2006 | Masaki et al. |
| 2006/0290804 | A1 | 12/2006 | Mino et al. |
| 2006/0290890 | A1 | 12/2006 | Saito et al. |
| 2007/0126884 | A1 | 6/2007 | Xu et al. |
| 2008/0118152 | A1 | 5/2008 | Thorn et al. |
| 2008/0316372 | A1 | 12/2008 | Xu et al. |
| 2009/0058845 | A1* | 3/2009 | Fukuda ............... B60K 35/00 345/214 |
| 2009/0097716 | A1 | 4/2009 | Wang et al. |
| 2009/0295835 | A1* | 12/2009 | Husoy ............... H04L 12/1827 345/660 |
| 2011/0254691 | A1 | 10/2011 | Ooi et al. |
| 2012/0092466 | A1 | 4/2012 | Choi |
| 2012/0229610 | A1 | 9/2012 | Fukushima et al. |
| 2012/0293405 | A1 | 11/2012 | Iida et al. |

FOREIGN PATENT DOCUMENTS

| | | | |
|---|---|---|---|
| JP | 07-303195 | 11/1995 | |
| JP | 08-105851 | 4/1996 | |
| JP | EP 0769881 A2 * | 4/1997 | ......... G02B 27/0093 |
| JP | 2000 152109 | 5/2000 | |
| JP | 3075971 | 12/2000 | |
| JP | 2001 16514 | 1/2001 | |
| JP | 2005 44330 | 2/2005 | |
| JP | 2007 65766 | 3/2007 | |
| JP | 2007 81677 | 3/2007 | |
| JP | 2007 158787 | 6/2007 | |
| JP | 2007236668 A | 9/2007 | |
| JP | 2008-197447 A | 8/2008 | |
| WO | WO 2009/067676 A1 | 5/2009 | |
| WO | 2010 021373 | 2/2010 | |

OTHER PUBLICATIONS

Extended European Search Report issued Aug. 8, 2013 in Patent Application No. 10815221.6.
Office Action issued Sep. 3, 2013 in Japanese Patent Application No. 2009-210988.
Combined Office Action and Search Report issued Mar. 5, 2014 in Chinese Patent Application No. 201080047771.6 with English language translation.
Japanese Office Action issued on Sep. 9, 2014 in Japanese Application No. 2013-238462, (7 pages).

* cited by examiner

FIG. 4
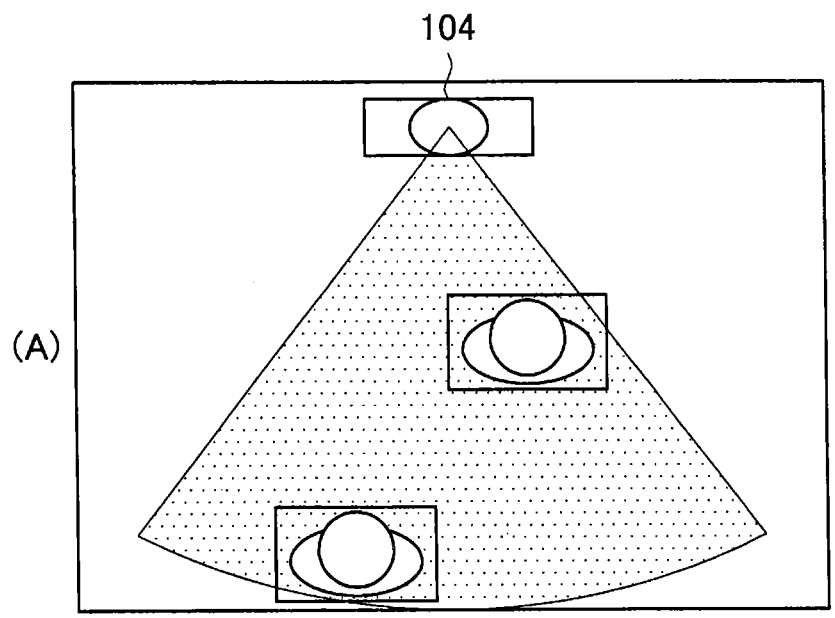
(A)
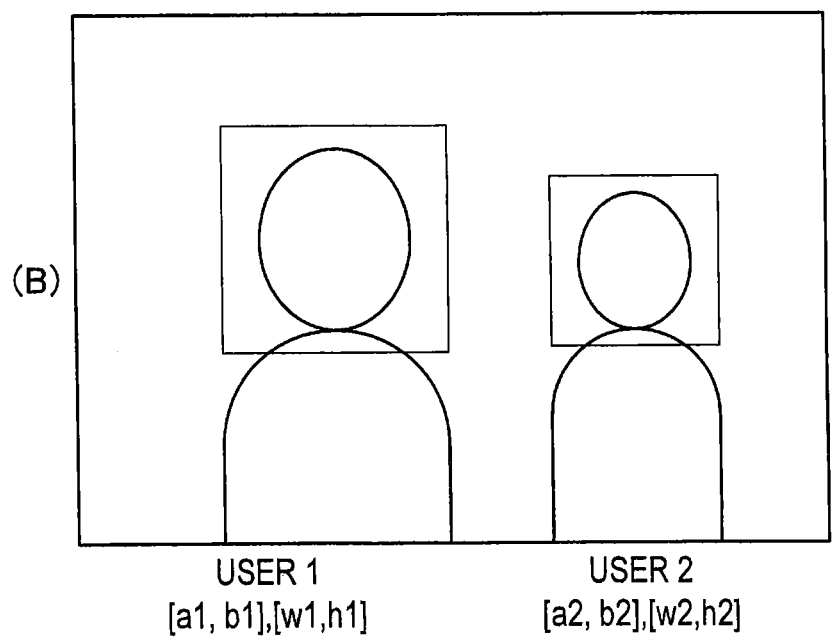
(B)
USER 1
[a1, b1],[w1,h1]
USER 2
[a2, b2],[w2,h2]

FIG. 8
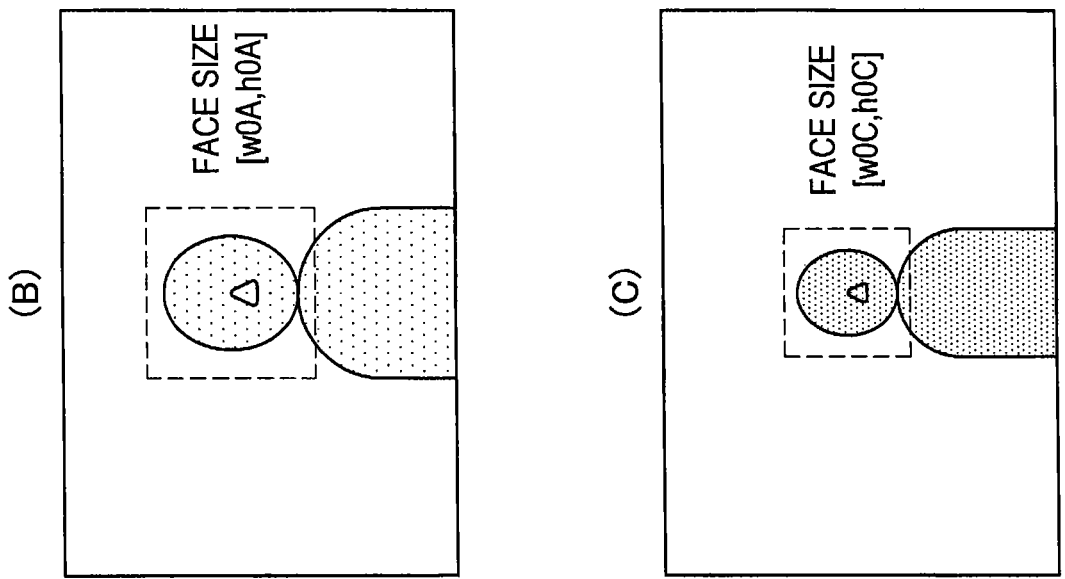
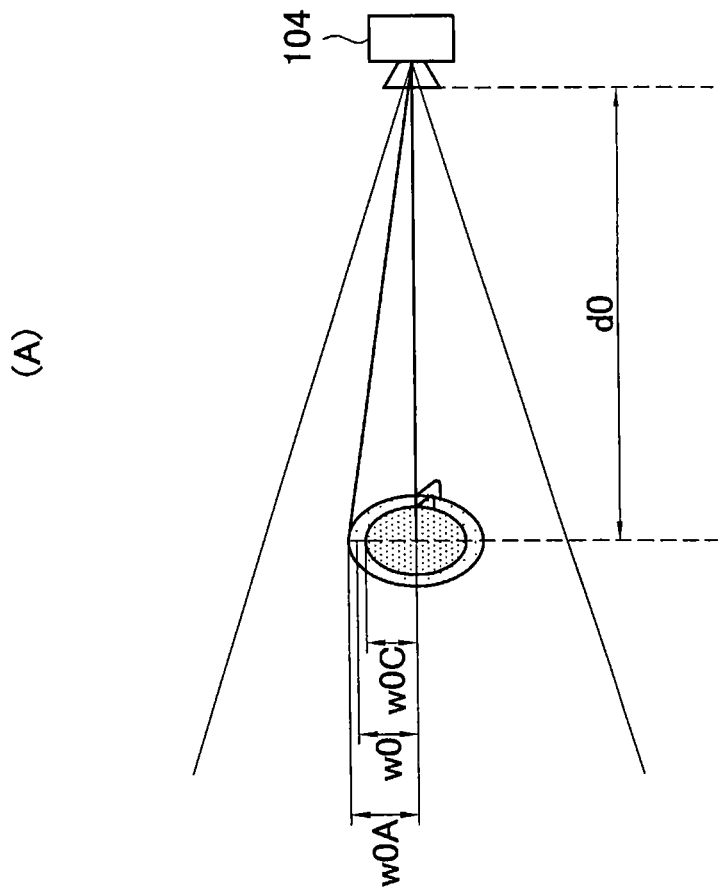

FIG. 10
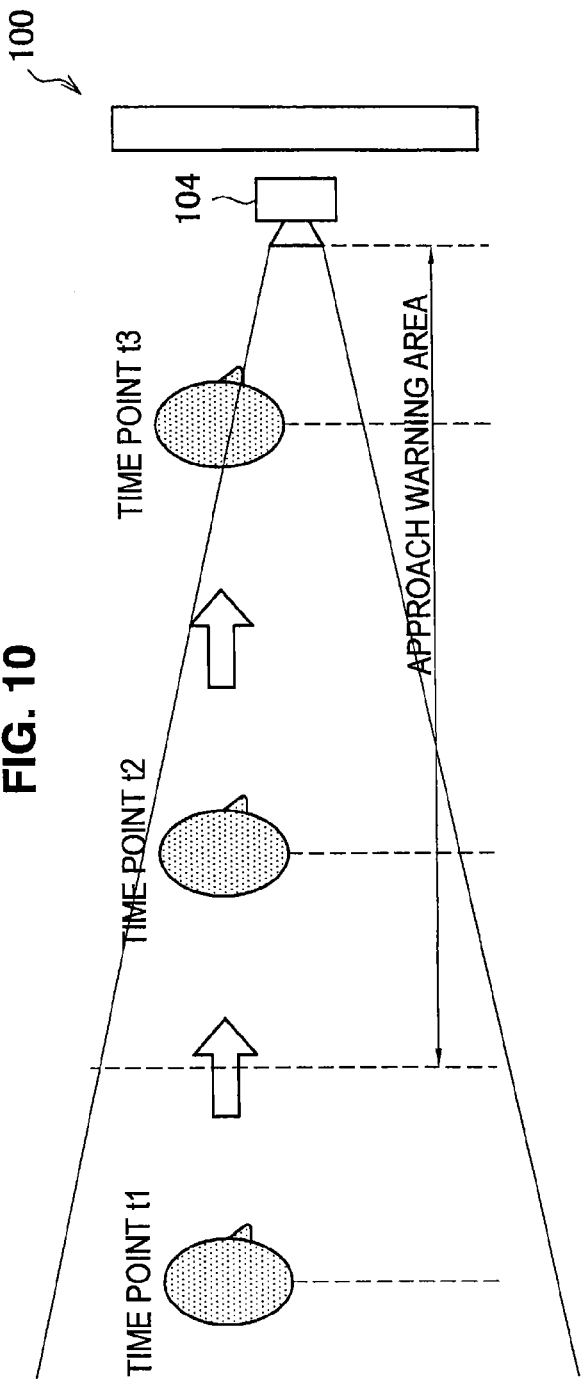
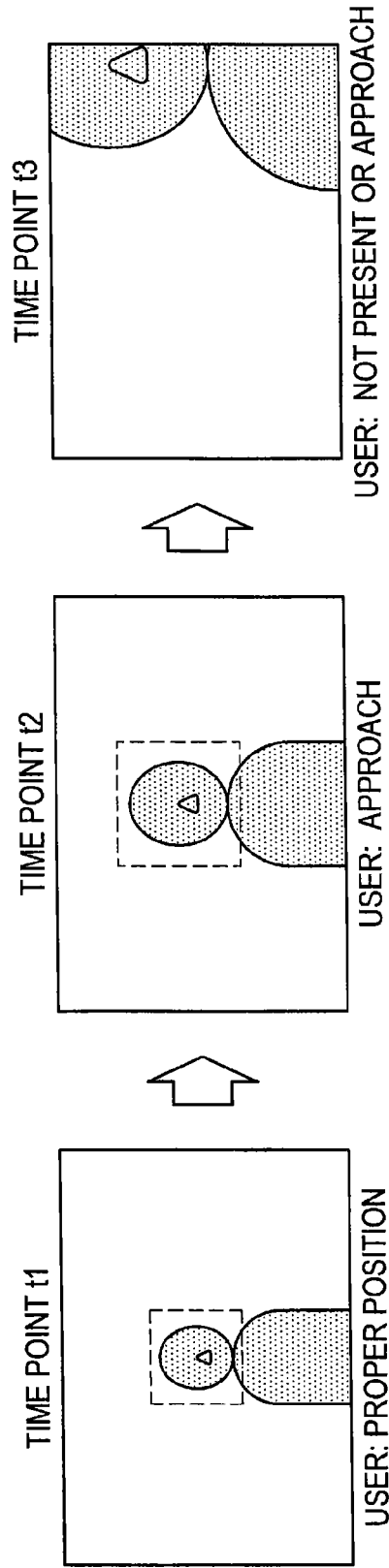

FIG. 11

|  | USER IS DETERMINED TO BE CHILD | USER IS DETERMINED TO BE ADULT |
| --- | --- | --- |
| USER: CHILD | A:TruePositive | B:FalseNegative |
| USER: ADULT | C:FalsePositive | D:TrueNegative |

DISPLAY APPARATUS AND CONTROL METHOD

CROSS-REFERENCE TO RELATED APPLICATIONS

This is a continuation of U.S. application Ser. No. 13/393,844, filed on May 10, 2012, now U.S. Pat. No. 8,913,007 B2, which is a U.S. national phase application of International Application PCT/JP2010/062310, filed on Jul. 22, 2010, and claims the benefit of priority from Japanese Application No. 2009-210988, filed on Sep. 11, 2009.

TECHNICAL FIELD

The present invention relates to a display apparatus and a control method.

BACKGROUND ART

Recently, with the expansion of a flat-screen television set market, there has been an increase in a demand for an image displaying apparatus, such as a large-screen television set, which is to be installed in a living room. In such a situation, there has been proposed an image displaying apparatus including various functions.

SUMMARY OF INVENTION

Technical Problem

Because a user can view an image displayed on the image displaying apparatus at any position, sometimes the user views the image displayed on the image displaying apparatus at an improper position.

For example, sometimes a child approaches a television screen because children tend to overdose easily on a broadcast content. When the child continuously views the image while approaching the television screen, a focus is fixed, which causes a risk of weakening eyesight or generating epilepsy. When the child excessively approaches the television screen, the television set possibly falls, causing injury to the child. Because children hardly recognize such risks, it is necessary to keep them away from the television screen. Further, possibly they approach the television screen to break a display portion of the television set, and they are injured by the display portion of the broken television set, it is necessary to keep them away from the television screen.

In light of the foregoing, an object of the present invention is to provide novel and improved display apparatus and control method capable of preventing the user from viewing the image at the improper viewing position.

Solution to Problem

According to an aspect of the present invention, in order to achieve the above-mentioned object, there is provided a display apparatus including: an imaging unit that captures a moving image in a predetermined range with respect to an image display direction; an image analyzer that analyzes the moving image captured by the imaging unit, and calculates a position of a target that should be guided to a proper viewing position; and a display controller that causes a display unit to perform display in order to guide the target to the proper viewing position when the target position calculated by the image analyzer is at an improper viewing position.

The display controller may cause the display unit to display a message that guides the target to the proper viewing position.

The display controller may cause the display unit to display a graph illustrating a distance between the target and the display unit.

The display controller may lower luminance of the display unit.

The display apparatus may further include a sound controller that causes a sound output unit to output a tone in order to guide the target to the proper viewing position when the target position detected by the image analyzer is at the improper viewing position.

When a determination of whether the target should be guided to the proper viewing position is made in analyzing the moving image captured by the imaging unit, the image analyzer may make a determination by a combination of a determination of whether the target should be guided to the proper viewing position and a determination of whether the target is not needed to be guided to the proper viewing position.

The image analyzer may make a determination using a past determination history when a determination of whether the target should be guided to the proper viewing position is made in analyzing the moving image captured by the imaging unit.

The image analyzer may calculate the position using a past calculation history when a position of the target that should be guided to the proper viewing position is calculated in analyzing the moving image captured by the imaging unit.

According to another aspect of the present invention, in order to achieve the above-mentioned object, there is provided a control method including: capturing a moving image in a predetermined range with respect to an image display direction; analyzing the captured moving image to calculate a position of a target that should be guided to a proper viewing position; and causing a display unit to perform display in order to guide the target to the proper viewing position when the calculated target position is at an improper viewing position.

Advantageous Effects of Invention

As described above, according to the present invention, the novel and improved display apparatus and control method capable of preventing the user from viewing the image at the improper viewing position can be provided.

BRIEF DESCRIPTION OF DRAWINGS

FIG. 4(A) is a view illustrating that case where a user 1 and a user 2 are present in an imaging range of an imaging unit 104, and FIG. 4(B) is a view illustrating a face detection position [a1, b1] and a face size [w1, h1] of the user 1, and a face detection position [a2, b2] and a face size [w2, h2] of the user 2, which are included in an image captured by the imaging unit 104.

FIGS. 8(A) to 8(C) are views illustrating a method for correcting the reference face size [w0, h0] at the reference distance d0 in calculating a user distance.

FIGS. 10(A) and 10(B) are views illustrating the case where a user's face goes out of an angle of view of the imaging unit 104 because the user comes excessively close to the imaging unit 104.

FIG. 11 is a view illustrating a result of a determination of whether the user is a child.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The explanation will be made in the following order.
<1. An Embodiment of the Invention>
[1-1. Structure of image displaying apparatus]
[1-2. Configuration of controller]
[1-3. Child approach preventing processing]

1. An Embodiment of the Invention

[1-1. Structure of Image Displaying Apparatus]

Figure 1:
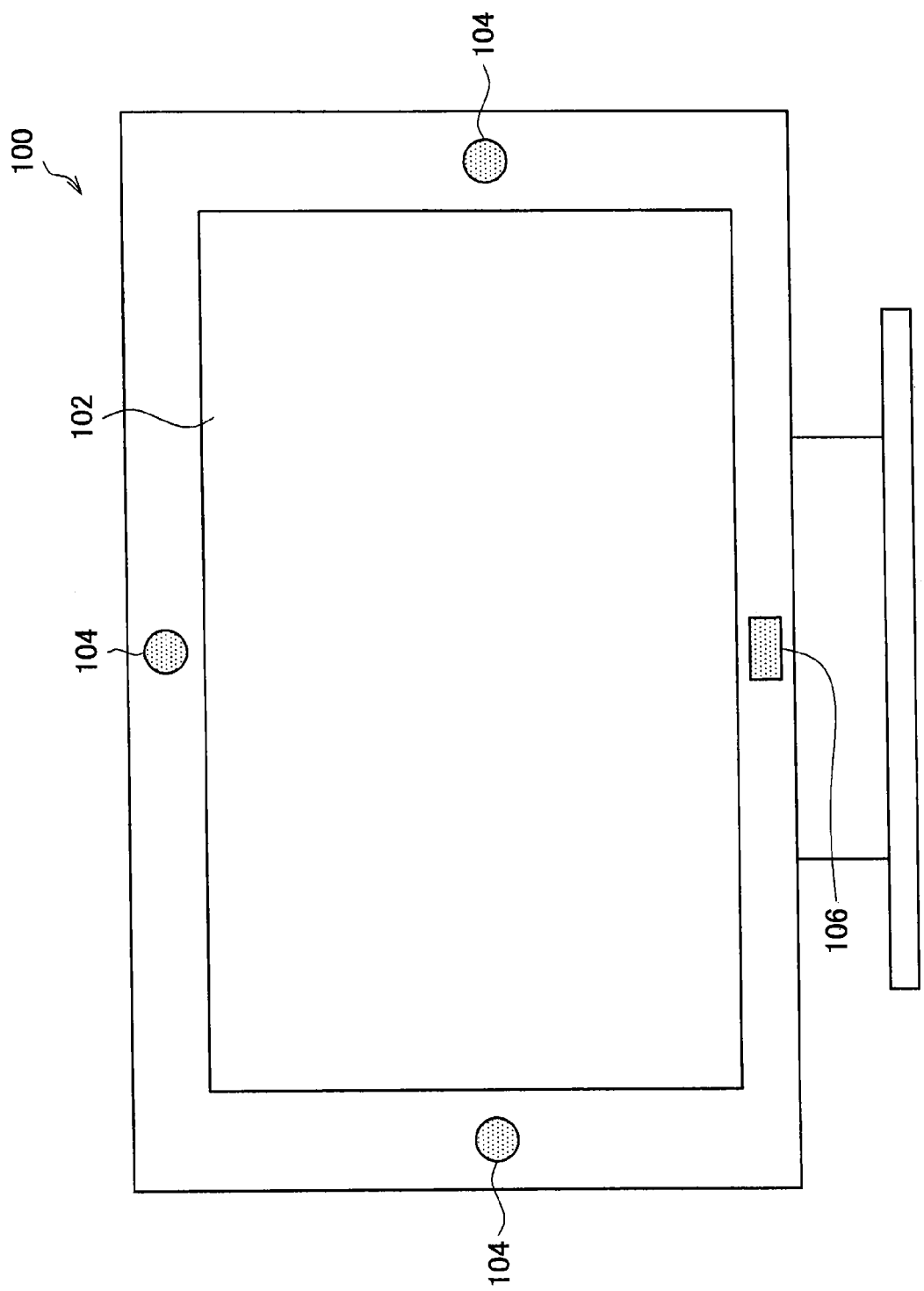
FIG. 1 is a view illustrating an appearance of an image displaying apparatus 100 according to an embodiment of the present invention.

A configuration of an image displaying apparatus according to an embodiment of the present invention will be described below. FIG. 1 is a view illustrating an appearance of an image displaying apparatus 100 of the embodiment. FIG. 1 is a front view of the image displaying apparatus 100 when viewed from a front side. The appearance of the image displaying apparatus 100 of the embodiment will be described below with reference to FIG. 1.

As illustrated in FIG. 1, the image displaying apparatus 100 of the embodiment of the present invention includes imaging units 104 that capture a moving image in an upper center portion and right and left center portions of a display panel 102 that displays a still image or a moving image. The imaging unit 104 captures the moving image with respect to a direction in which the image displaying apparatus 100 displays the still image or the moving image on the display panel 102. The image displaying apparatus 100 of the embodiment analyzes the image captured by the imaging unit 104, and detects a user's face in the image. The image displaying apparatus 100 analyzes the image of the detected user's face to calculate other pieces of attribute information on age, sex, and the like. Based on the calculated pieces of attribute information, the image displaying apparatus 100 determines where the user is a child or an adult. The image displaying apparatus 100 also analyzes the image of the detected user's face to detect a face detection position and a face size. The image displaying apparatus 100 calculates a position of the user based on a result of the determination of whether the user is a child or an adult and detection results of the face detection position and face size of the user. One of the features of the image displaying apparatus 100 of the embodiment is that, when the user who is a child is located at an improper position of the image displaying apparatus 100, for example, within a range of 1 m from the display panel 102, a display or sound is output in order to guide the child to the optimum viewing position, for example, that is at least 1 m away from the display panel 102.

The image displaying apparatus 100 of the embodiment of the present invention includes a sensor 106 in a lower center portion of the display panel 102. The sensor 106 detects presence or absence of a human in front of the image displaying apparatus 100.

In FIG. 1, the image displaying apparatus 100 includes the imaging units 104 that capture the moving image at three points around the display panel 102. It is needless to say that, in the present invention, the place where the imaging unit 104 captures the moving image is not limited to the above three points. For example, another device is provided independently of the image displaying apparatus 100, and the device may be connected to the image displaying apparatus 100 to capture the moving image. The number of imaging units 104 is, of course, not limited to three, but one or two or at least four imaging units 104 may be provided to capture the moving image. The number of sensors 106 is not limited to one, but two or more sensors may be provided.

Although not illustrated in FIG. 1, the image displaying apparatus 100 may further include a signal receiving unit that can receive a control signal from a remote controller (not illustrated) through an infrared or wireless manner.

The appearance of the image displaying apparatus 100 has been described above with reference to FIG. 1. A configuration of the image displaying apparatus 100 of the present invention will be described below.

Figure 2:
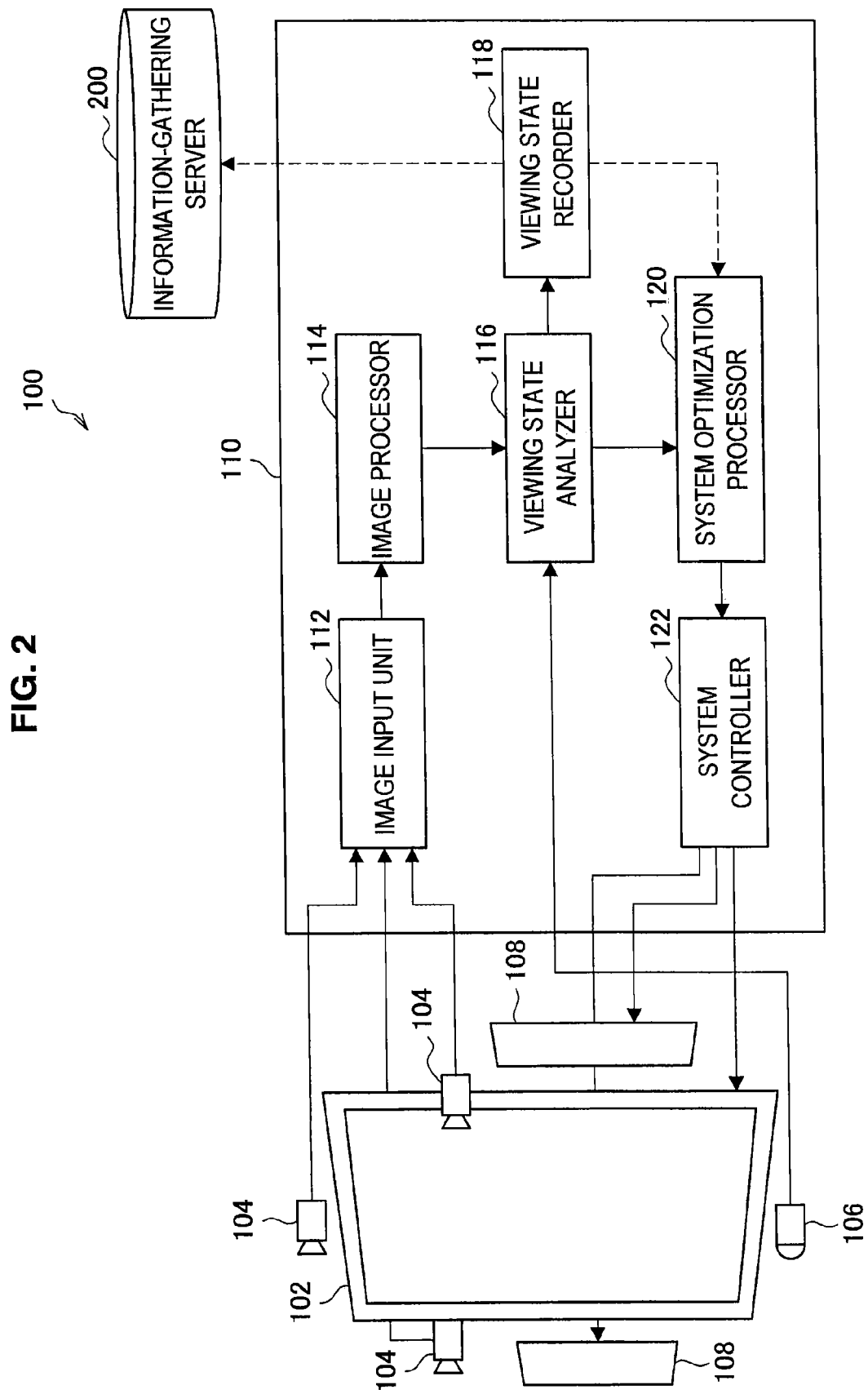
FIG. 2 is a view illustrating a configuration of the image displaying apparatus 100 according to an embodiment of the present invention.

FIG. 2 is a view illustrating the configuration of the image displaying apparatus 100 of the embodiment of the present invention. The configuration of the image displaying apparatus 100 of the embodiment will be described below with reference to FIG. 2.

As illustrated in FIG. 2, the image displaying apparatus 100 of the embodiment includes the display panel 102, the imaging units 104, the sensor 106, a speaker 108, and a controller 110.

The controller 110 is configured to include an image input unit 112, an image processor 114, a viewing state analyzer 116, a viewing state recorder 118, a system optimization processor 120, and a system controller 122.

The display panel 102 is an example of the display unit of the present invention, and displays the still image or the moving image based on a panel driving signal. In the embodiment, in the display panel 102, the still image or the moving image is displayed on a liquid crystal display panel. Needless to say, the display panel 102 is not limited to the liquid crystal display panel. The display panel 102 may display the still image or the moving image using a self-luminous display device, such as an organic EL (Electro Luminescence).

As described above, the imaging units 104 are included in the upper center portion and right and left center portions of the display panel 102 that displays the still image or the moving image. The imaging units 104 capture the moving image with respect to the direction in which the image displaying apparatus 100 displays the moving image on the display panel 102 when the panel driving signal is supplied to the display panel 102 and the moving image is displayed on the display panel 102. The imaging unit 104 may capture the moving image using a CCD (Charge Coupled Device), or capture the moving image using a CMOS (Complementary Metal Oxide Semiconductor) image sensor. The moving image captured by the imaging unit 104 is transmitted to the controller 110.

As described above, the sensor 106 is included in the lower center portion of the display panel 102 that displays the still image or the moving image. For example, the sensor 106 detects the presence or absence of a human in front of the image displaying apparatus 100. The sensor 106 can detect a distance between the image displaying apparatus 100 and the human when the human is present in front of the image displaying apparatus 100. The detection result and distance information from the sensor 106 are transmitted to the controller 110. The speaker 108 is an example of the sound output unit of the invention, and outputs the sound based on a sound output signal.

The controller 110 controls an operation of the image displaying apparatus 100. Each unit of the controller 110 will be described below.

The image input unit 112 receives the moving image captured by the imaging unit 104. The moving image received by the image input unit 112 is transmitted to the image processor 114, and used in image processing performed by the image processor 114.

The image processor 114 is an example of the image analyzer of the present invention. The image processor 114 performs various pieces of image processing to the moving image, which is captured by the imaging unit 104 and transmitted from the image input unit 112. The pieces of image processing performed by the image processor 114 include processing of detecting a dynamic body included in the moving image captured by the imaging unit 104, processing of detecting the number of humans included in the moving image, and processing of detecting a face and a facial expression that are included in the moving image. Results of various pieces of image processing performed by the image processor 114 are transmitted to the viewing state analyzer 116, and used to analyze the presence or absence of a person who views the image displaying apparatus 100 and a viewing state and a viewing position of the person who views the image displaying apparatus 100.

In the image processor 114, for example, a technology disclosed in Japanese Patent Application Laid-Open 2007-65766 (JP-A) or JP-A 2005-44330 can be used as the processing of detecting the face included in the image. The face detecting processing will briefly be described below.

In order to detect the user's face from the image, a position of the face, a size of the face, and a direction of the face are detected in the supplied image. When the position and size of the face are detected, a portion of the face image can be cut out from the image. Facial characteristic portions (facial characteristic positions) such as an eyebrow, an eye, a nose, and a mouth are detected from the cut-out face image and the information on the face direction. In order to detect the facial characteristic positions, for example, a method called AAM (Active Appearance Models) can be adopted to detect the characteristic position.

When the facial characteristic positions are detected, a local characteristic amount is calculated with respect to each detected facial characteristic position. The local characteristic amount is calculated, and the calculated local characteristic amount is stored along with the face image, which allows the face to be identified from the image captured by the imaging unit 104. For example, a technology disclosed in JP-A 2007-65766 or JP-A 2005-44330 can be used in the face identifying method. Therefore, the detailed description is omitted herein. Whether the face of the supplied image is a male or female, or how old the person is can be determined by the face image and the facial characteristic position. When the face information is previously recorded, the person of the supplied image is searched from the recorded and an individual can be identified.

The viewing state analyzer 116 is an example of the image analyzer of the present invention. The viewing state analyzer 116 receives the results of various pieces of image processing performed by the image processor 114 as well as the detection result and distance information detected by the sensor 106, and analyzes whether the person who views the image displayed by the image displaying apparatus 100 is a child or an adult and the viewing state and viewing position of the person who views the image using the results of various pieces of image processing performed by the image processor 114 as well as the detection result and distance information detected by the sensor 106. The viewing state analyzer 116 analyzes whether the person who views the image displayed by image displaying apparatus 100 is a child or an adult and the viewing state and viewing position of the person who views the image, which allows the image displaying apparatus 100 to lower the luminance of the display panel 102, control display contents of the display panel 102, and controls sound contents based on whether the person who views the image displaying apparatus 100 is a child or an adult and the viewing position of the person. The analysis result of the analysis processing performed by the viewing state analyzer 116 is transmitted to the viewing state recorder 118 and the system optimization processor 120.

The viewing state analyzer 116 can detect the dynamic body from the detection result and distance information detected by the sensor 106. Alternatively, the dynamic body may be set out of the detection target when the distance between the sensor 106 and the dynamic body is longer than a predetermined distance.

The viewing state recorder 118 records the analysis result that is obtained through the analysis processing of the viewing state analyzer 116. The analysis result of the viewing state analyzer 116, which has been recorded in the viewing state recorder 118, is used in system optimization processing performed by the system optimization processor 120. The analysis result of the viewing state analyzer 116, which has been recorded in the viewing state recorder 118, may be transmitted to an external information-gathering server 200.

The system optimization processor 120 is an example of the image analyzer of the present invention. Using the analysis result that is obtained through the analysis processing performed by the viewing state analyzer 116, the system optimization processor 120 calculates system control information in order to perform the system optimization processing to each unit of the image displaying apparatus 100. Examples of the system optimization processing performed to each unit of the image displaying apparatus 100 include luminance control of the display panel 102, control of the display contents of the display panel 102, control of the sound contents output from the speaker 108, and volume control of the sound.

The image displaying apparatus 100 can perform child approach preventing processing based on the system control information calculated by the system optimization processor 120. The system control information calculated by the system optimization processor 120 is transmitted to the system controller 122.

The system controller 122 is an example of the display controller and the sound controller of the present invention, and performs system optimization processing to each unit of the image displaying apparatus 100 based on the system control information calculated by the system optimization processor 120. Specifically, based on the system control information calculated by the system optimization processor 120, the system controller 122 performs the luminance control of the display panel 102, the control of the display contents of the display panel 102, the control of the sound contents output from the speaker 108, the volume control of the sound, and the like.

The configuration of the image displaying apparatus 100 according to the embodiment of the present invention has been described above with reference to FIG. 2. Next, a structure of the controller 110 included in the image displaying apparatus 100 of the embodiment will be described in detail below.

[1-2. Configuration of Controller]

Figure 3:
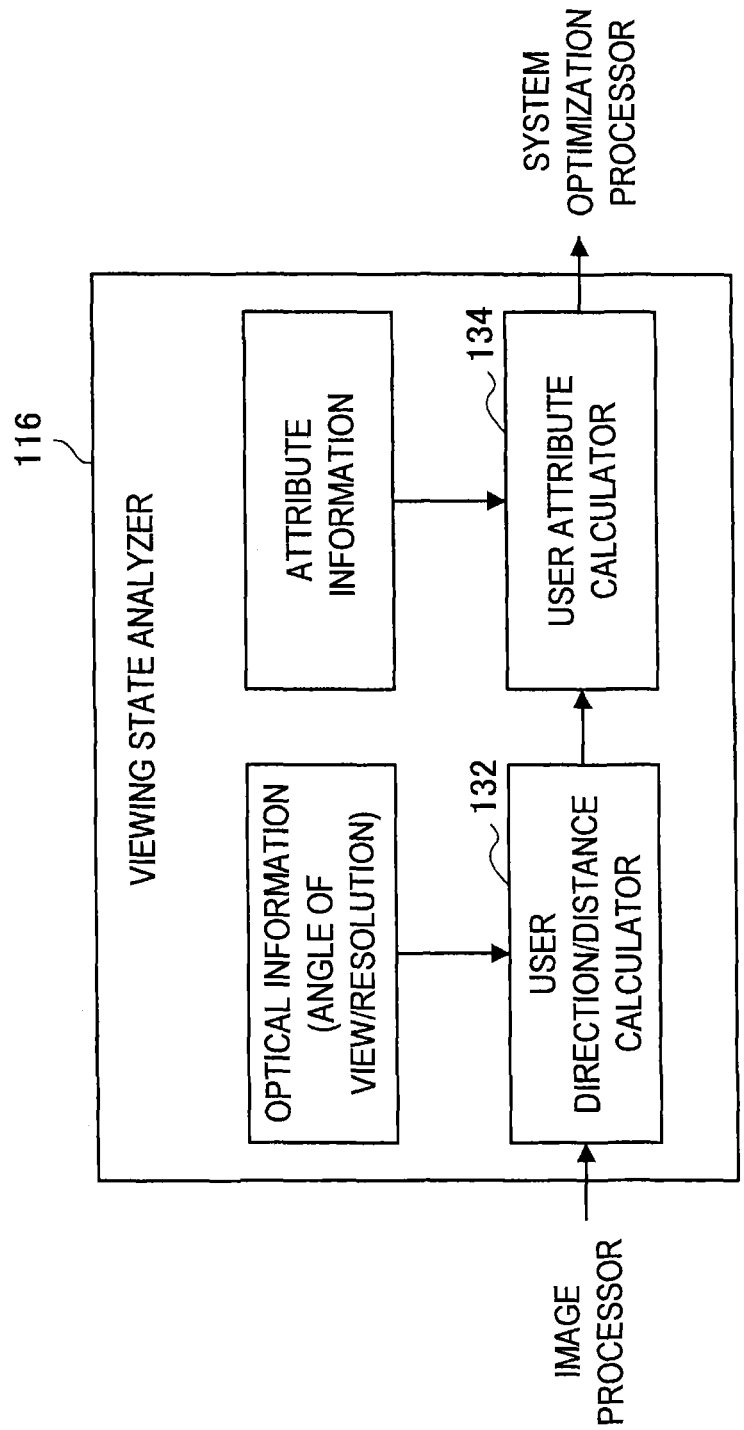
FIG. 3 is a view illustrating a configuration of a controller 110.

FIG. 3 is a view illustrating the configuration of the controller 110 included in the image displaying apparatus 100 according to the embodiment of the present invention. FIG. 3 illustrates the configuration of, specifically, the viewing state analyzer 116 included in the controller 110. The configuration of the viewing state analyzer 116 will be described below with reference to FIG. 3.

As illustrated in FIG. 3, the viewing state analyzer 116 is configured to include a user direction/distance calculator 132 and a user attribute calculator 134.

Figure 5:
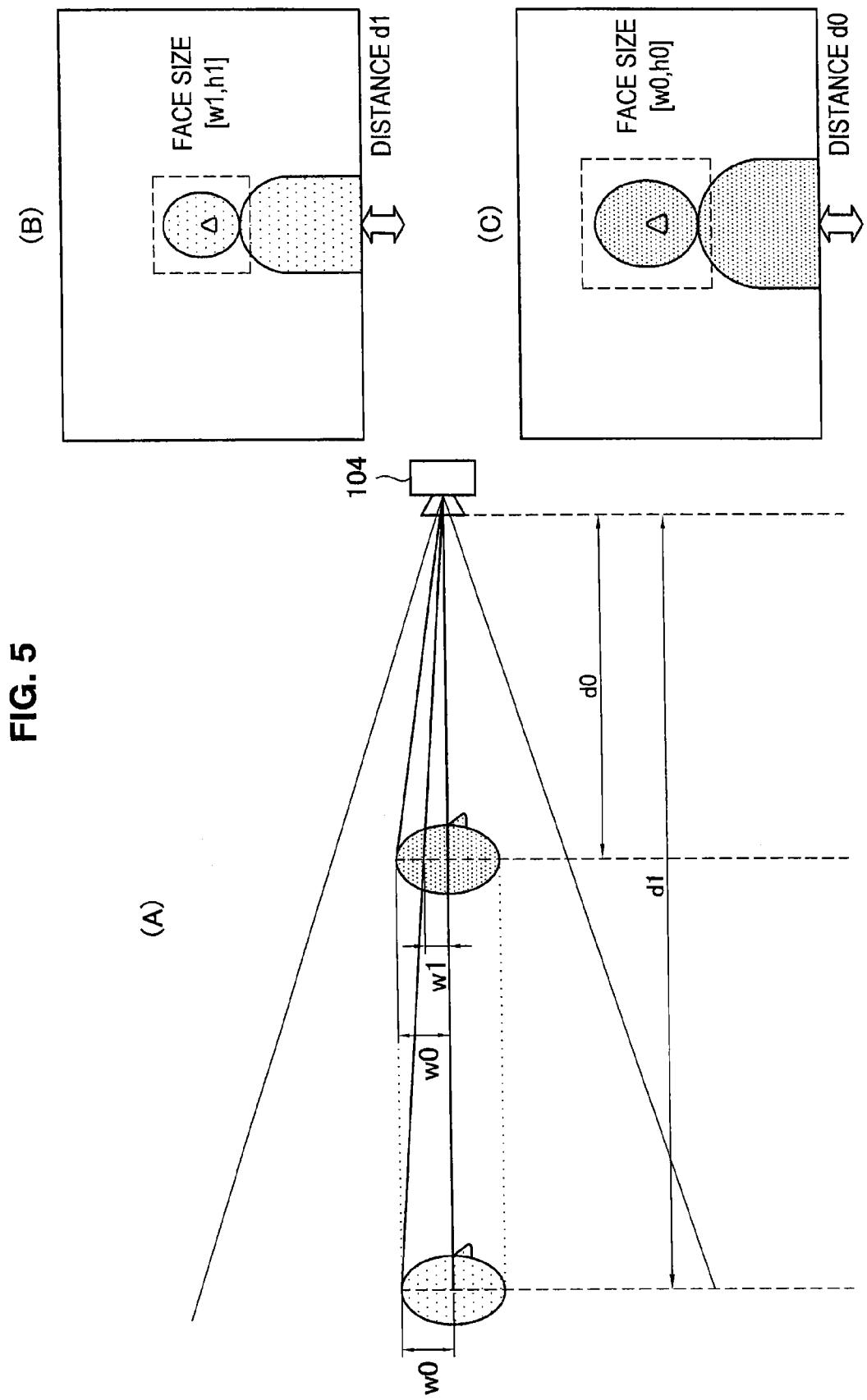
FIG. 5(A) is a view illustrating the case where a user is present at a reference distance d0 and a distance d1 in the imaging range of the imaging unit 104.
FIG. 5(B) is a view illustrating the face size [w1, h1] of the user at the distance d1 in the image captured by the imaging unit 104.
FIG. 5(C) is a view illustrating a reference face size [w0, h0] of the user at the reference distance d0 in the image captured by the imaging unit 104.

The user direction/distance calculator 132 receives the results of various pieces of image processing performed by the image processor 114 as well as pieces of optical information such as the angle of view and the resolution of the imaging unit 104, and calculates a relative position (direction [$\phi 1$, $\theta 1$] and distance d1) of the user with respect to an optical axis of the imaging unit 104 using the results of various pieces of image processing performed by the image processor 114 as well as the pieces of optical information on the imaging unit 104. FIG. 4(A) is a view illustrating the case where a user 1 and a user 2 are present in an imaging range of an imaging unit 104, and FIG. 4(B) is a view illustrating a face detection position [a1, b1] and a face size [w1, h1] of the user 1 and a face detection position [a2, b2] and a face size [w2, h2] of the user 2, which are included in an image captured by the imaging unit 104. FIG. 5(A) is a view illustrating the case where a user is present at a reference distance d0 and a distance d1 in the imaging range of the imaging unit 104, FIG. 5(B) is a view illustrating the face size [w1, h1] of the user at the distance d1 in the image captured by the imaging unit 104, and FIG. 5(C) is a view illustrating a reference face size [w0, h0] of the user at the reference distance d0 in the image captured by the imaging unit 104.

As to the direction [$\phi 1$, $\theta 1$], the horizontal direction: $\phi 1 = \phi 0 * a1$ and the vertical direction: $\theta 1 = \theta 0 * b1$ are calculated from the face detection position [a1, b1] normalized by a captured image size [xmax, ymax] and the angle of view [$\phi 0$, $\theta 0$] of the imaging unit 104. As to the distance d1, the distance: $d1 = d0 * (w0/w1)$ is calculated from the reference face size [w0, h0] at the reference distance d0.

The user attribute calculator 134 receives the results of various pieces of image processing performed by the image processor 114 and pieces of attribute information, such as an age of the user, which are obtained by the image processor 114. The user attribute calculator 134 determines whether the user is a child or an adult using the results of various pieces of image processing performed by the image processor 114 and the pieces of attribute information obtained by the image processor 114.

At this point, the image processor 114 transmits the captured image and face detection information (such as the face detection position [a1, b1], the face size [w1, h1], and other pieces of attribute information such as the age and the sex) on each user who utilizes the image displaying apparatus 100 in the captured image to the user direction/distance calculator 132 and user attribute calculator 134 of the viewing state analyzer 116. In the viewing state analyzer 116, the user direction/distance calculator 132 performs processing of analyzing the viewing position of the human who views the image displaying apparatus 100 using the pieces of information transmitted from the image processor 114. The user attribute calculator 134 performs processing of analyzing whether the human who views the image displaying apparatus 100 is a child or an adult using the pieces of information transmitted from the image processor 114.

When a child is located in the improper viewing position of the image displaying apparatus 100, the system optimization processor 120 calculates system control information for processing (child guide implementing processing) of guiding the child to the proper viewing position of the image displaying apparatus 100 using the results of the pieces of analysis processing that are performed by the user direction/distance calculator 132 and the user attribute calculator 134. Examples of the processing of being capable of guiding the child to the proper viewing position of the image displaying apparatus 100 include processing of displaying a guide message at an optimum viewing position on the display panel 102 while lowering the luminance of the display panel 102 and processing of displaying a graph of an approach distance and a warning message on the display panel 102. Examples of the processing of being capable of guiding the child to the proper viewing position of the image displaying apparatus 100 also include processing of displaying the guide message at the optimum viewing position on the display panel 102 while darkening the display panel 102 and processing of producing the warning sound from the speaker 108. The system control information for the child guide implementing processing, which has been calculated by the system optimization processor 120, is transmitted to the system controller 122 and used in child approach preventing processing.

The structure of the controller 110 included in the image displaying apparatus 100 according to the embodiment of the present invention has been described above with reference to FIG. 3. Next, the child approach preventing processing performed by the image displaying apparatus 100 of the embodiment will be described below.

[1-3. Child Approach Preventing Processing]

Figure 6:
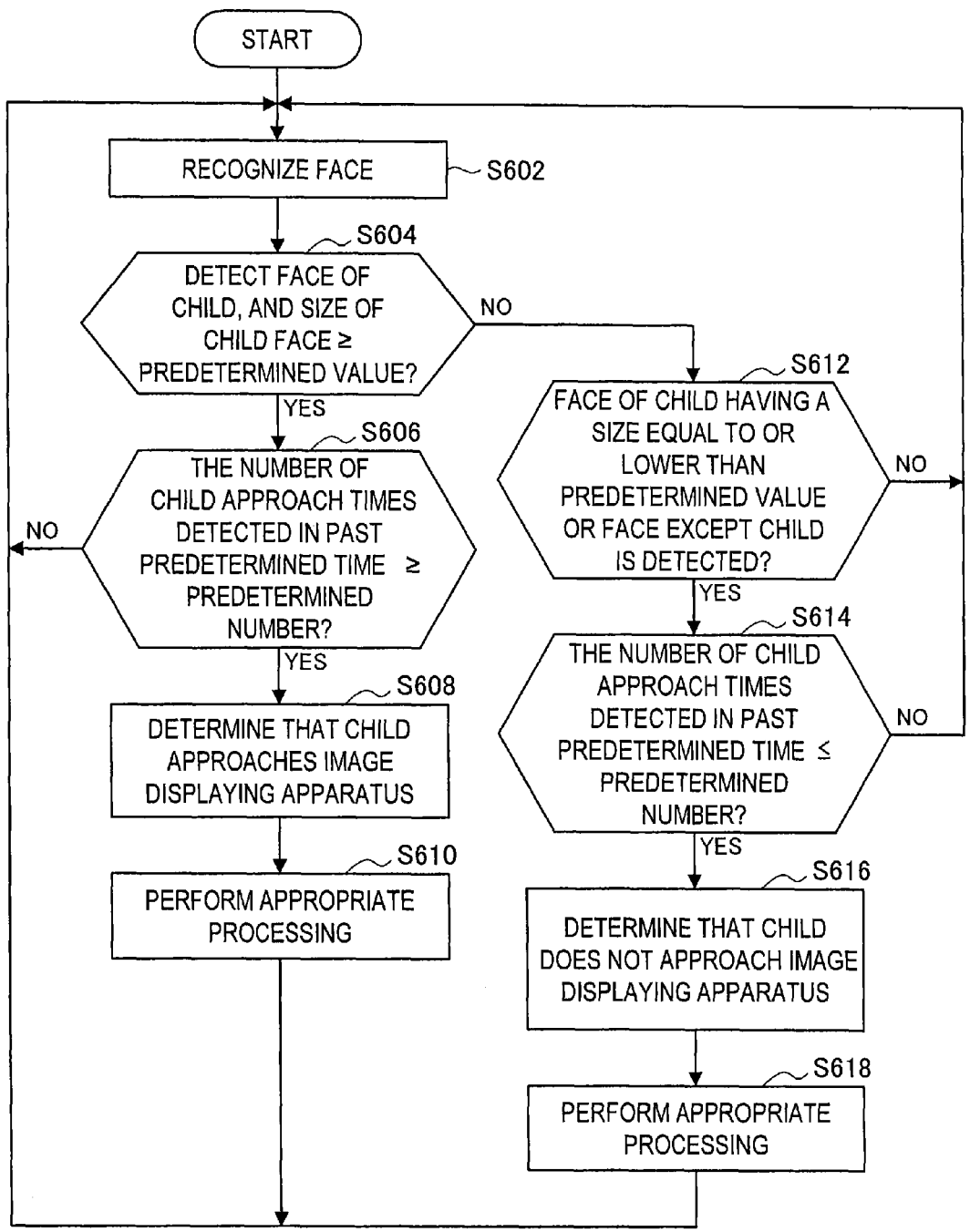
FIG. 6 is a flowchart illustrating an example of child approach preventing processing performed by the image displaying apparatus 100 according to an embodiment of the present invention.

FIG. 6 is a flowchart illustrating an example of the child approach preventing processing performed by the image displaying apparatus 100 according to an embodiment of the present invention. The child approach preventing processing performed by the image displaying apparatus 100 of the embodiment will be described below with reference to FIG. 6.

Referring to FIG. 6, when the imaging unit 104 of the image displaying apparatus 100 starts to capture the image, the image processor 114 of the image displaying apparatus 100 performs the processing of detecting the face included in the image captured by the imaging unit 104, and recognizes the face of the person who views the image displayed by the image displaying apparatus 100 (Step S602).

Then, using the pieces of information transmitted from the image processor 114, the viewing state analyzer 116 of the image displaying apparatus 100 performs the processing of analyzing the viewing position of the human who views the image displaying apparatus 100 and the processing of analyzing whether the human is a child or an adult. Using the result of the analysis processing performed by the viewing state analyzer 116, the system optimization processor 120 of the image displaying apparatus 100 determines whether the child is located in the improper viewing position of the image displaying apparatus 100, namely, whether the child approaches the image displaying apparatus 100. Specifically, the system optimization processor 120 determines whether the child's face is detected, and determines whether the size of the child's face, namely, a face size is equal to or more than a predetermined value (Step S604). It is assumed that a reference face size of the child in the reference position is previously registered in the image displaying apparatus 100. The predetermined value is a face size of the child in the improper viewing position of the image displaying apparatus 100.

As a result of the determination in Step S604, when the child's face is detected and when the face size of the child is equal to or more than the predetermined value (YES in Step S604), the system optimization processor 120 determines whether the number of child approach times detected in a past predetermined time is equal to or more than a predetermined value (Step S606). When the number of child approach times detected in a past predetermined time is lower than the predetermined value (NO in Step S606), the flow returns to the processing in Step S602. The predetermined time can properly be set. The predetermined value can properly be changed according to the set predetermined time.

As a result of the determination in Step S606, when the number of child approach times detected in the past predetermined time is equal to or more than the predetermined value (YES in Step S606), the system optimization processor 120 determines that the child approaches the image displaying apparatus 100 (Step S608).

Figure 7:
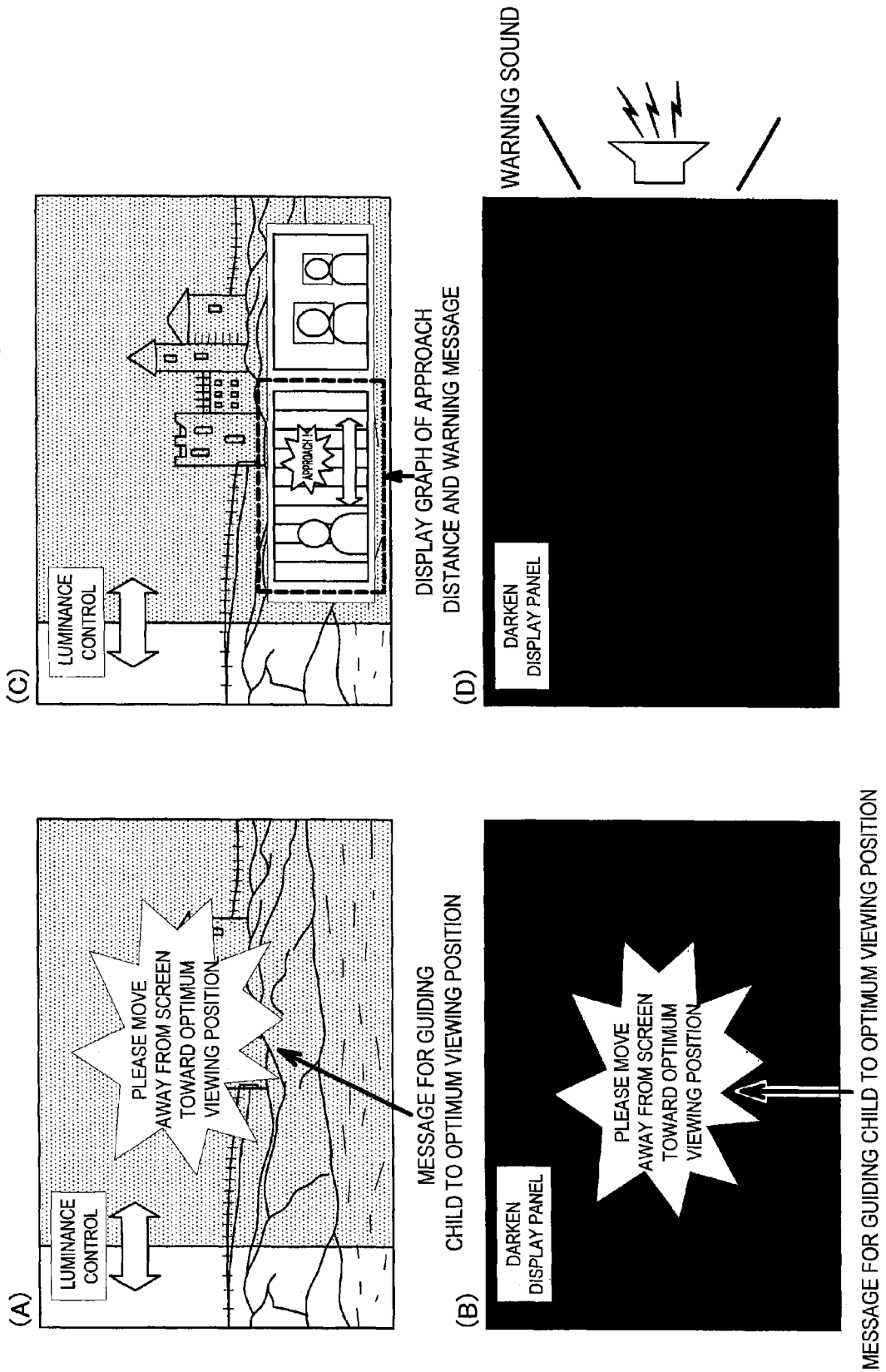
FIGS. 7(A) to 7(D) are views illustrating a method for guiding a child to an optimum viewing position.

Then the system optimization processor 120 calculates the system control information for the child guide implementing processing described above, and transmits the calculated system control information to the system controller 122. Based on the system control information received from the system optimization processor 120, the system controller 122 performs the luminance control of the display panel 102, the control of the display contents of the display panel 102, the control of the sound contents output from the speaker 108, the volume control of the sound, and the like (Step S610). As illustrated in FIG. 7(A), a message for guiding the child to the optimum viewing position is displayed on the display panel 102 while the luminance of the display panel 102 is lowered. As illustrated in FIG. 7(B), the message for guiding the child to the optimum viewing position is displayed on the display panel 102 while the display panel 102 is darkened. As illustrated in FIG. 7(C), a graph of an approach distance between the image displaying apparatus 100 and the user and a warning message are displayed on the display panel 102 while the luminance of the display panel 102 is lowered. As illustrated in FIG. 7(D), a warning sound is produced from the speaker 108 while the display panel 102 is darkened. The remote controller (not illustrated) may be vibrated along with the above pieces of processing. The flow returns to the processing in Step S602.

As a result of the determination in Step S604, when the child's face is detected and when the face size of the child is smaller than the predetermined value (NO in Step S604), the system optimization processor 120 determines whether the child having the face size smaller than the predetermined value or any face except a child's face has been detected (Step S612). When the child having the face size smaller than the predetermined value or the face except a child's face has not been detected (NO in Step S612), the flow returns to the processing in Step S602.

As a result of the determination in Step S612, when the child having the face size smaller than the predetermined value or the face except a child's face is detected (YES in Step S612), the system optimization processor 120 determines whether the number of child approach times detected in the past predetermined time is equal to or lower than the predetermined value (Step S614). When the number of child approach times detected in the past predetermined time is more than the predetermined value (NO in Step S614), the flow returns to the processing in Step S602.

As a result of the determination in Step S614, when the number of child approach times detected in the past predetermined time is equal to or lower than the predetermined value (YES in Step S614), the system optimization processor 120 determines that the child does not approach the image displaying apparatus 100 (Step S616).

Subsequently, when the system controller 122 performs the luminance control of the display panel 102, the control of the display contents of the display panel 102, the control of the sound contents output from the speaker, the volume control of the sound, and the like based on the system control information for the child guide implementing processing, the system optimization processor 120 calculates the system control information for returning to the normal display processing, and transmits the calculated system control information to the system controller 122. Based on the system control information received from the system optimization processor 120, the system controller 122 performs processing of returning the luminance and display contents of the display panel 102 and the sound contents output from the speaker 108 to the normal state (Step S618). Then, the flow returns to the processing in Step S602.

According to the child approach preventing processing in FIG. 6, when the number of child approach times detected in the past predetermined time is equal to or more than the predetermined value, the system optimization processor 120 determines that the child approaches the image displaying apparatus 100. The system controller 122 performs the processing of guiding the child to the proper viewing position of the image displaying apparatus 100, for example, processing in which the guide message is displayed on the display panel 102 while the luminance of the display panel 102 is lowered as illustrated in FIG. 7(A). Therefore, the child can be prevented from approaching to the image displaying apparatus 100 and from viewing and listening at the improper position for the image displaying apparatus 100. Accordingly, the weakening eyesight and the generation of the epilepsy, which are attributed to the fact that the focus of the child is fixed when the child continuously views the image while approaching the image displaying apparatus 100, can be prevented. The falling of the image displaying apparatus 100, which is caused by the excessive approach of the child to the image displaying apparatus 100, can be prevented. The risk that the child approaches the image displaying apparatus 100 to break the display unit of the image displaying apparatus 100 or the risk that the child is injured by the broken display unit of the image displaying apparatus 100 can be eliminated.

In the embodiment, as illustrated in FIGS. 8(A) to 8(C), in calculating the viewing position of the user, a variation in reference face size [w0, h0] in the reference distance d0 may be corrected using the following correction table. For example, a data table of an average face size at the age of the user is previously stored from the attribute information on the age of the user, the reference face size [w0, h0] is set to a face size [w0C, h0C] smaller than the reference face size as illustrated in FIG. 8(C) when the user is a child, and the reference face size [w0, h0] is set to a face size [w0A, h0A] larger than the reference face size as illustrated in FIG. 8(B) when the user is an adult.

In the embodiment, in calculating the viewing position of the user, when the user who utilizes the image displaying apparatus 100, for example, a family of the installation place of the image displaying apparatus 100 is previously registered in the image displaying apparatus 100, the face size of each user may be registered in the data table. Therefore, the reference face size can be changed for each user. A method for registering the user face size of each user can be implemented in a manner such that the image of the user is captured along with the distance information in conjunction with another distance sensor (not illustrated), such that the image of the user is captured after the user is guided to a given distance, or such that the image of the user is captured at the same distance as a scale that serves as a reference.

Figure 9:
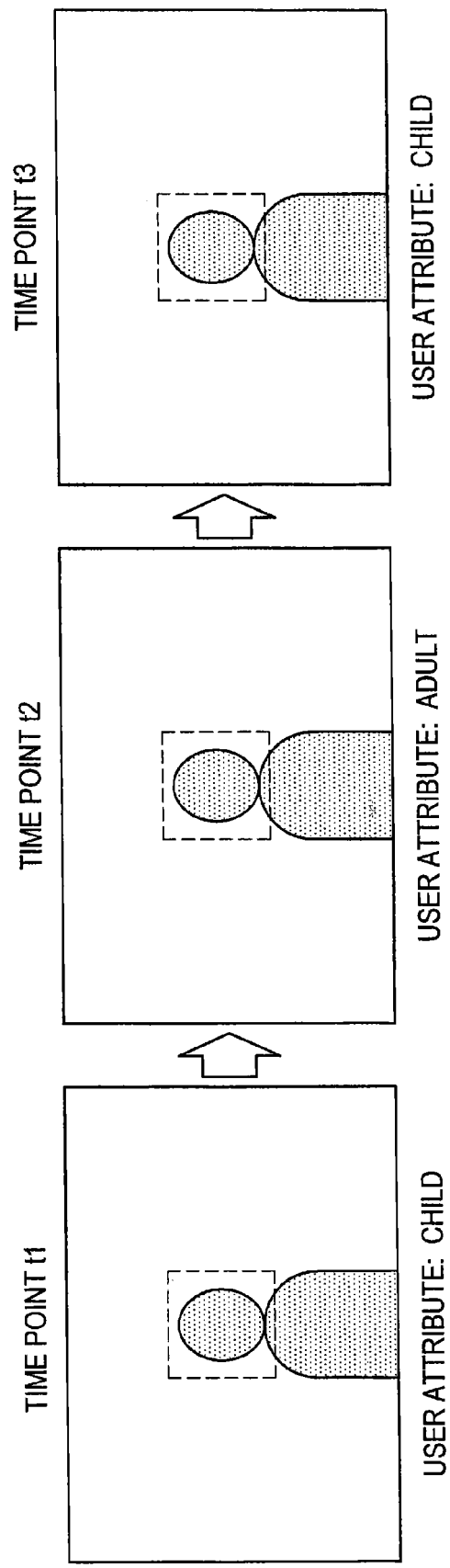
FIG. 9 is a view illustrating a time-series fluctuation of attribute information on a user.

As illustrated in FIG. 9, even for the same user, the attribute information on the user is fluctuated in time series. Therefore, in the embodiment, when the system optimization processor 120 determines whether the user is a child or an adult, the determination is made based on a time-series tendency, namely, using a past determination history. For example, as illustrated in FIG. 9, it is assumed that the attribute information on the user is the attribute information on a child at a time point t1, that the attribute information on the user is the attribute information on an adult at a time point t2, that the attribute information on the user is the attribute information on a child at a time point t3. In this case, during a predetermined time, during a period between the time point t1 and time point t3, the determination that the user is a child can be made because the determination that the user is a child has been made a given number of times, for example, at least two.

In the embodiment, the determination of the child approach is made when the number of child approach times detected in the past predetermined time is equal to or more than the predetermined value. However, as illustrated in FIGS. 10(A) and 10(B), the user could occasionally excessively approach the imaging unit 104 as shown at the time point t3 and the user's face goes out of the angle of view of the imaging unit 104, thereby the face is hardly detected. Therefore, in the embodiment, using the pieces of information at the time points t1 and t2 immediately before the time point t3 at which the user's face is no more detected, namely, the past position calculation histories, the determination that the user approaches the image displaying apparatus 100 over the imaging range of the imaging unit 104 may be made by calculating or presuming the position at the time point t3. When part of the user's body covers the imaging unit 104, precision of the determination of whether the above-mentioned user approaches the image displaying apparatus 100 over the imaging range of the imaging unit 104 can be improved by, for example, a background difference or dynamic body detection (a size of motion area).

In the embodiment, when the determination of whether the user is a child or an adult is made using the attribute information on the age of the user and the like, a rate of a false determination is reduced in the child determination by a combination of a determination of whether the user is a child and a determination of whether the user is an adult. A method for reducing the rate of the false determination in the child determination will specifically be described below.

As illustrated in FIG. 11, the following four cases are possible as the results of the determination of whether the user is a child.

Case A: TruePositive (the determination that the user is a child has been correctly made)

Case B: FalseNegative (the determination that the user is a child has not been made when such determination should be made)

Case C: FalsePositive (the determination that the user is a child has been made when such determination should not be made)

Case D: TrueNegative (the determination that the user is not a child has been correctly made)

In the embodiment, in order that the determination that the child approaches the image displaying apparatus 100 is correctly made, the case C, in which the determination that the user is a child is made when such determination should be made, needs to be eliminated in the determination of whether the user is a child. For example, it is assumed that 85%@FPR10% is the determination precision of the determination of whether the user is a child. It is herein assumed that FPR (False Positive Rate)=Case C/(Case C+Case D), and Precision=Case A/(Case A+Case C).

In the case where the determination of whether a use is a child is made on 100 persons who are actually children and 150 persons who are actually adults at the above determination precision, when it is determined that 100 persons are children, 85 persons fall under the Case A, 15 persons fall under the Case B, 15 persons fall under the Case C, and 135 persons fall under the Case D. Accordingly, 85 persons are correctly determined to be children among the 100 persons who are actually children, and 15 persons are falsely determined to be children among the 150 persons who are actually adults.

Figure 12:
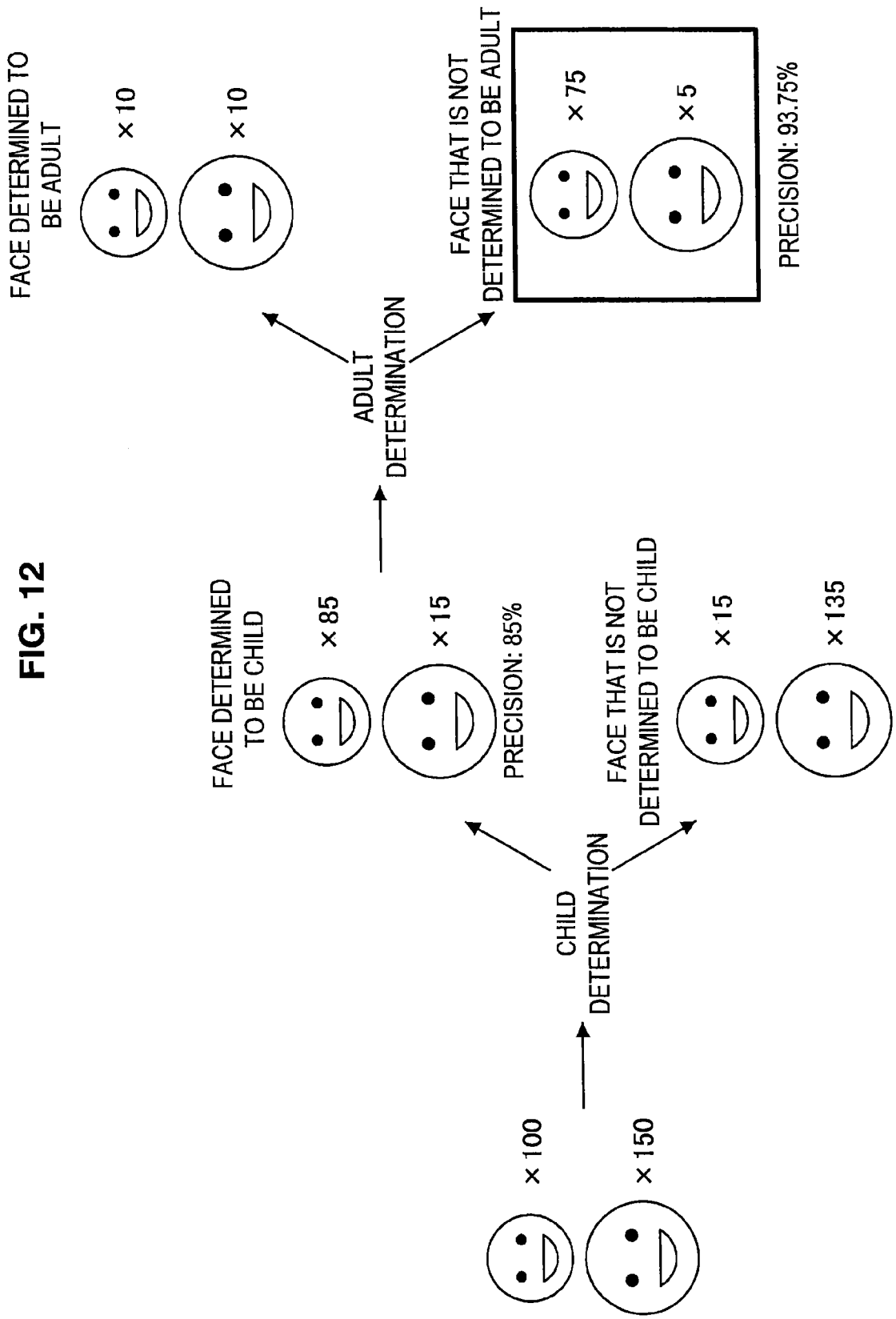
FIG. 12 is a view illustrating a method for determining whether the user is a child.

In the embodiment, as illustrated in FIG. 12, the determination of whether the user is an adult is made after the determination of whether the user is a child. For example, as described above, the 85 actual children have been determined to be children and the 15 actual adults have been determined to be children in the determination of whether the user is a child. In the case where they are then subject to the determination where the user is an adult, because it is expected that the person who is actually adult is more likely to be determined to be an adult compared with the person who is actually a child, for example, it can be expected that 10 persons are falsely determined to be an adults among the 85 actual children and that 10 persons are correctly determined to be adults among the 15 actual adults. Accordingly, the 75 persons are correctly determined to be non-adults among the 85 actual children, and the 5 persons are falsely determined to be non-adults in the 15 actual adults. Thus, in the embodiment, the determination of whether the user is a child is made by combination of the determination of whether the user is a child and the determination of whether the user is an adult. Therefore, as illustrated in FIG. 12, the determination precision of the determination of whether the user is a child can be enhanced from the determination precision of 85% with the determination solely whether the user is the child to the determination precision of 93.75% with the combination of the determination of whether the user is a child and the determination of whether the user is an adult.

The above series of pieces of processing can be performed by either hardware or software. In the case where the series of pieces of processing can be performed by the software, a program constituting the software is installed from a program recording medium into a computer incorporated in the dedicated hardware. Alternatively the program is installed from a general-purpose personal computer that can execute various functions by installing various programs.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGN LIST

100 Image displaying apparatus
102 Display panel
104 Imaging unit
106 Sensor
108 Speaker
110 Controller
112 Image input unit
114 Image processor
116 Viewing state analyzer
118 Viewing state recorder
120 System optimization processor
122 System controller
132 User direction/distance calculator
134 User attribute calculator

The invention claimed is:

1. An information processing device, comprising:
an imaging unit configured to capture an image of a user in a display direction;
a sensor configured to detect a distance between the user and the information processing device;
an image analyzer configured to detect the user in the captured image, to calculate a direction of the user with respect to an optical axis of the imaging unit, and to calculate a viewing position to which the user should be guided; and
a display controller configured to cause a display unit to display information to guide the user to an optimum viewing position,
wherein the image analyzer is configured to make a determination of whether the user should be guided to the optimum viewing position, by checking the calculated direction of the user and the detected distance between the user and the information processing device.

2. The display apparatus according to claim 1, wherein the display controller causes the display unit to display a message that guides the user to the optimum viewing position.

3. The display apparatus according to claim 1, wherein the display controller causes the display unit to display a graph illustrating a distance between the user and the information processing device.

4. The display apparatus according to claim 1, wherein the display controller lowers luminance of the display unit.

5. The display apparatus according to claim 1, further comprising a sound controller that causes a sound output unit to output a tone to guide the user to the optimum viewing position when the calculated position of the user is at a position other than the optimum viewing position.

6. The display apparatus according to claim 1, wherein the image analyzer makes the determination using a past determination history.

7. The display apparatus according to claim 1, wherein the image analyzer calculates the optimum viewing position based on the analysis of the captured moving image.

8. An information processing method, comprising:
capturing an image of a user with respect to a direction in which an image is displayed by a display unit;
detecting a distance between the user and the information processing device, analyzing the captured image of the user, calculating a direction of the user with respect to an optical axis of the imaging unit, and calculating a viewing position to which the user should be guided; and
causing a display unit to display information to guide the user to an optimum viewing position,
wherein analyzing determines whether the user should be guided to the optimum viewing position, by checking the calculated direction of the user and the detected distance between the user and the information processing device.

* * * * *